United States Patent [19]

Kühnlein

[11] 4,236,974
[45] Dec. 2, 1980

[54] PROCESS AND APPARATUS FOR PURIFYING WASTE WATERS

[75] Inventor: Hans Kühnlein, Füllinsdorf, Switzerland

[73] Assignee: Hch. Bertrams Aktiengesellschaft, Basel, Switzerland

[21] Appl. No.: 14,167

[22] Filed: Feb. 22, 1979

Related U.S. Application Data

[63] Continuation of Ser. No. 804,746, Jun. 8, 1977, abandoned.

[30] Foreign Application Priority Data

Jun. 18, 1876 [CH] Switzerland .................. 7806/76

[51] Int. Cl.³ .................. B01D 3/00; C02F 1/04
[52] U.S. Cl. .................. 203/11; 159/47 WL; 202/174; 202/182; 203/25; 203/39; 210/182; 210/758; 431/210
[58] Field of Search .................. 159/47 WL, DIG. 8; 202/153, 174, 182; 203/10, 11, 25, 31, 39; 210/63 R, 67, 71, 73 R, 73 SG, 150, 152, 180–182, 188; 423/224; 431/11, 163, 210

[56] References Cited

U.S. PATENT DOCUMENTS

| | | |
|---|---|---|
| 2,944,396 | 7/1960 | Barton et al. .................. 210/63 R |
| 3,243,359 | 3/1966 | Schmidt .................. 203/10 |
| 3,296,125 | 1/1967 | Hegner .................. 210/63 R |
| 3,668,120 | 6/1972 | Patterson .................. 423/224 |
| 3,741,890 | 6/1973 | Smith et al. .................. 210/73 SG |
| 3,804,756 | 4/1974 | Callahan et al. .................. 210/63 R |
| 3,855,076 | 12/1974 | Marecaux .................. 159/47 WL |
| 4,017,421 | 4/1977 | Othmer .................. 159/47 WL |

*Primary Examiner*—Charles N. Hart
*Assistant Examiner*—Peter A. Hruskoci
*Attorney, Agent, or Firm*—Birch, Stewart, Kolasch & Hirch

[57] ABSTRACT

A process and apparatus for purifying waste water which comprises introducing said waste water into a separation zone, removing a portion of the impurities recovered from said separation zone, and concentrating said impurities by their introduction into an evaporation system to form a still fluid residue and remaining impurities composed of impurities in gaseous and vapor form together with waste vapors, transferring said remaining impurities to an oxidation chamber, and supplying said oxidation chamber with heat and air, thereby oxidizing said remaining impurities through spontaneous combustion, wherein the proportion of the low boiling-point impurities in the waste water introduced into the separation zone is adjusted to a predetermined value.

4 Claims, 3 Drawing Figures

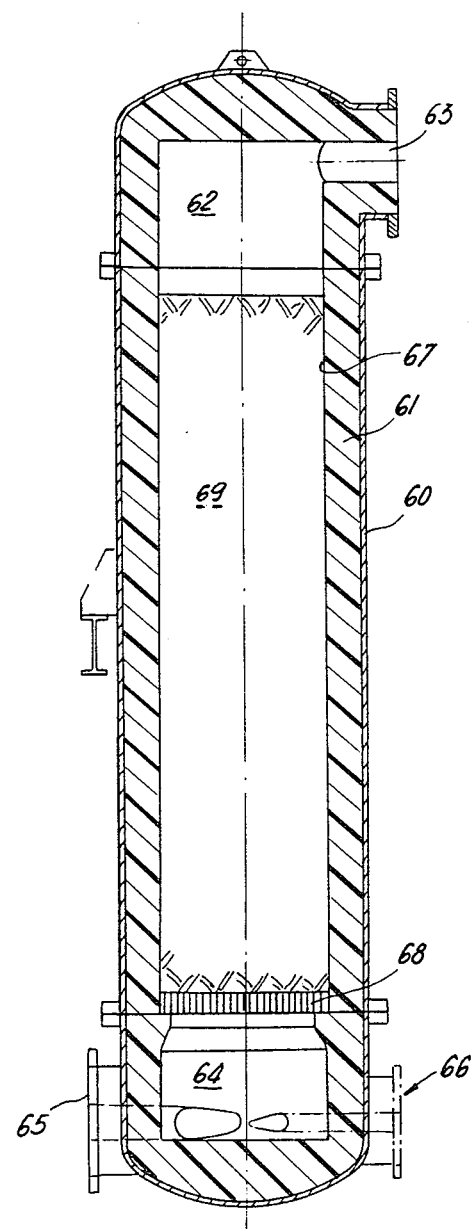

PROCESS AND APPARATUS FOR PURIFYING WASTE WATERS

This application is a continuation of copending application Ser. No. 804,746, filed on June 8, 1977, now abandoned.

BACKGROUND AND SUMMARY OF THE INVENTION

The present invention relates to a process and to an apparatus for purifying waste waters.

In some cases, where the impurities in industrial waste waters cannot be biologically degraded, there only remains combustion to total oxidation of the impurities. Such combustion requires great expenditures in energy for the evaporation of the amount of water involved. Furthermore, the subsequent purification of the large volumes of gas thus produced involves high equipment costs. Processes already have been proposed wherein multistage evaporation of the water is utilized which concentrates the impurities into a residue which then can at least, in part, be burned. The heat released, for instance, from organic impurities during such a combustion, forms the main source of energy for the concentration process. However, when the water component is being evaporated, the more volatile impurities also pass into the vapor phase, whereby the water of this vapor phase, obtained from a multistage evaporation system, again includes impurities to such an extent as to require further purification, utilizing, for example, activated carbon or other expensive procedures.

This drawback is eliminated by the process of the present invention in a particularly advantageous and economical manner wherein the proportion of low-boiling point impurities in the waste water is adjusted to a predetermined value, whereupon part of the impurities of the waste water following an evaporation process is concentrated into a still fluid residue while the gaseous impurities leaving the evaporation stage together with the waste vapors are brought to spontaneous combustion and hence to complete oxidation by treating them with heat and air. Appropriately, the waste vapors strongly heated during this oxidation are used to transfer said heat to the waste vapors introduced into oxidation. A particularly economical operation can be achieved in that the waste vapors expelled from the oxidation stage and consisting of pure water vapor and inertly behaving gases, following preheating of the waste vapors arriving at the oxidation stage, are cooled approximately to the condensation temperature in a subsequent step, for instance by the spray injection of water, whereupon they release their heat content by heat-exchange condensation, whether for the purpose of operating further evaporation stages or the generation of useful steam. The residue concentrate obtained from one or more evaporation stages may also be burned, for instance, to obtain heat for the evaporation procedure with or without the use of auxiliary fuels, or else it may be dried and stored. Again, waste vapors containing impurities of relatively low-boiling points obtained, for instance, from the pretreatment of the waste water or from a first evaporation stage may be fed to combustion for instance by supplying heat to the evaporation process. In every case, the result is that the water vapor departing from the waste-vapor oxidation after its condensation supplies pure water practically free of organic or inorganic impurities.

The apparatus for implementing the process of the present invention is provided with thermal equipment for cleaning the waste water to a predetermined content of low-boiling point impurities, with an evaporation system to concentrate the high-boiling-point impurities and for evaporation the low-boiling impurities, and also with equipment for oxidizing the combustible and oxidizable impurities still contained in the waste vapors leaving the evaporation system and previously heated to spontaneous combustion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 3 shows a cross section of an embodiment of an oxidation system.

DESCRIPTION OF THE PREFERRED EMBODIMENTS

Figure 1:
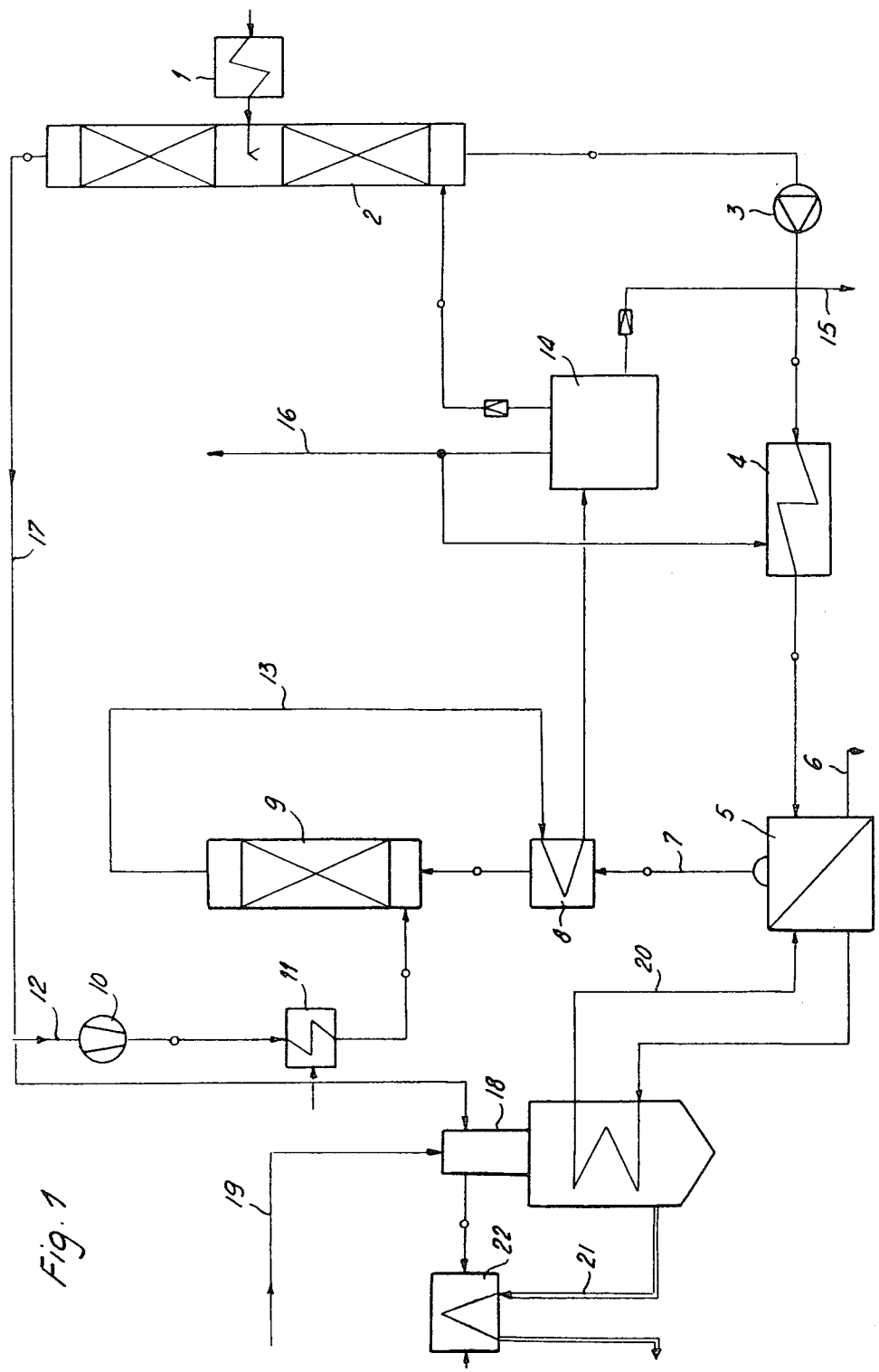
FIG. 1 shows a diagram of the first embodiment of a waste-water purification apparatus.

The apparatus shown in FIG. 1 is provided with a preheater 1 for the incoming waste water, which is followed by a so-called stripping column 2. The water outlet from the stripping column is connected through a pump 3 and a preheater 4 to an evaporation system 5. The outlet line for the concentrate from system 5 is denoted by 6. A vapor conduit 7 passes through a heater 8 to an oxidation system 9. The oxidation system 9 is connected to an air line 12 containing a compressor 10 and passing through a preheater 11. The waste-vapor exhaust line 13 of the oxidation system 9 passes in the form on a heat transfer conduit through heater 8 to a heat exchanger 14, leaving latter as pure water line 15. The vapor outlet of heat exchanger 14 is connected to stripping column 2 for the purpose of supplying heat thereto. It may be similarly connected to preheaters 14 and 11 for the purpose of supplying heat thereto or through line 16 to further heat consumers, for example, to a steam generator or to a further evaporation stage.

The waste-vapor outlet of stripping column 2 is connected through a line 17 to a combustion system 18, which, in turn, is also connected to an auxiliary fuel supply line 19. The heat of combustion from the combustion system 18 passes through a heat transfer conduit 20 to evaporation system 5, whereas exhaust line 21 of the combustion system 18 passes through an air cooler 24 into the ambient atmosphere.

The described system operates in such a manner that the impurities having lower boiling points are expelled down to a predetermined proportion and are burned to the vapor form, while the proportion of water vapor together with the residual impurities of low boiling points are subjected to an oxidation treatment in which the impurities are burned, so that clean water vapor and inertly behaving gases are generated which result in a clean condensate, when the water vapor is made to condense, said condensate according to regulations being considered to be clean water.

The waste water is first heated at 1 and then fed to stripping column 2, the proportion of the low boiling-point impurities being expelled for instance by steam distillation or rectification to such an extent that the waste-water flow leaving the column retains a given amount of low boiling-point impurities, as a rule combustible hydrocarbons, together with all of the high-boiling point impurities. Thereupon the flow of waste water passes through pump 3 into preheater 4 and into the evaporator system 5. The evaporator system consists for instance of a forced-circulation evaporator to prevent encrustation during the concentration of higher boiling-point impurities. The flow of steam together with the expelled waste vapors is then fed to superheater 8, where the crude waste vapors are heated to 600° C. for instance by means of the superheated vapors issuing from oxidation chamber 9. Simultaneously, the air required for the combustion of the low-boiling point residual impurities is supplied through compressor 10 and preheater 11 to the reaction chamber of said oxidation chamber 9. Practical experimentation has shown that with a proportion of roughly 2% of combustible hydrocarbons having a caloric power H of 6,000 kcal/kg for instance, combustion upon introduction of the oxidizing air takes place at 600° C., oxidation taking place by selfsuperheating in the reaction chamber. For reasons of providing good mixing, the reaction chamber is appropriately filled with packing material, thereby ensuring a corresponding gas turbulence, whereby the vapor flow is heated to about 800° C., and the impurities are completely oxidized. The dwell time of the waste vapors in the reaction chamber is about 3 seconds and therefore the purified vapors, when at the outlet of the oxidation chamber, flow jointly with the combustion gases in line 13. This steam-gas flow first is used to heat the crude waste vapors from evaporator 5. Then the hot vapor flow is further cooled, for instance by the injection of water, so as to be condensed in exchanger 14, be it for the purpose of multistage evaporation or to generate useful steam. The entire evaporation and oxidation process takes place under an increased pressure of 3–20 atm. gauge, depending on the number of stages in such an apparatus or the steam pressure which is generated, so that the waste-vapor volumes remain particularly low, especially in the oxidation equipment. Thus, the cross sections of the pressure-resistant equipment may be kept small.

A large portion of the vapor may be condensed in view of the partial pressure ratio of water-vapor/combustion gases because the proportion of uncondensable gases can be controlled to be low. The noncondensing amount of water vapor together with the combustion gases from oxidation equipment 9 is subsequently used to operate the stripping column 2, so that almost complete thermal utilization of the waste-vapor flow can occur. The expelled low-boiling point impurities from stripping column 2 are supplied together with other gases to combustion system 18. Temperatures of 900° to 1200° C. are reached in this direct combustion chamber, which is fed exclusively with impurities of low-boiling points and mostly organic in nature. As a rule, clean combustion gases are achieved, so that in many cases there is no need for a subsequent purification of fumes. The heat generated in this combustion is used through the heat transfer circuit 20 to heat the concentration process, whereby an autonomous system economical in heat for the concentration of highly impure waste waters is achieved, which is capable of separating the maximum amount of water in a clean form. In many cases it is feasible to separate up to 90% of the water and the low-boiling point impurities from the concentrate of the residue. Experimentation has shown that the waste-vapor condensate purified in this manner may be purified, on the average, down to 7 mg of organic residue for each liter of water, so that these condensates, in turn, can be utilized as clean water.

The purification of the low-boiling point impurities generally consisting of hydrocarbons and passing into the vapor phase in evaporator 5 takes place, as already mentioned, in the reaction chamber of oxidation apparatus 9 in the presence of heated air which is added thereto. It has been found that at temperatures exceeding 600° oxidation is self-spontaneous and thus raises the temperature of the waste-vapor flow to about 800° C. when the low boiling point proportion of hydrocarbons in stripping column 2 is roughly about 2%. The vapor oxidizing chamber of apparatus 9 comprises a masonry-lined chamber which is filled, for example, with raschig rings having a diameter for instance of 4–8 cm. The raschig rings provide a uniform dwell time for the waste-vapor flow of about 1–3 seconds. The masonry is so outwardly insulated that the external pressure-tight steel casing can be designed for low temperatures. Therefore, the entire process can be economically carried out at excess pressure, and this, in turn, allows economical utilization of the heat with respect to the subsequent condensation of the vapor. This furthermore permits the size of the reaction chamber, which is determined by the vapor volume, to be made correspondingly small.

It has been found that the proportion of the low-boiling point hydrocarbons, for instance various solvents, may vary substantially in industrial waste waters. If, for instance, magnitudes from 1 to 8% were fed, without prior pretreatment, to the waste-vapor oxidation stage, either there would be insufficient combustible hydrocarbons to obtain the oxidation temperature of 800° C., or, in the presence of excessive contents in hydrocarbons, an excessive amount of air would be required to achieve complete oxidation, whereby the subsequent condensation of the water vapor no longer would be economically permissible because of the high gas content. Therefore, one of the main features of the present process is the adjustment of the combustible impurities in the waste-vapors phase. This is achieved in that a stripping column or a rectification column precedes the evaporation of the waste vapors for the purpose of supplying the low-boiling point hydrocarbons, which are present in excess, in vapor form because of their caloric value together with water to combustion oven 18. Such combustion is much freer of problems than that of concentrated residues, because as a rule, those hydrocarbons are present which may be easily burned and which readily ignite with additional, auxiliary fuel.

Inversely, if there is a deficiency of low-boiling point hydrocarbons, the flow of waste water may temporarily be supplied with such an amount of waste solvents that the required oxidizing temperature is reached during the vapor oxidation.

When the facility operates with excess pressure, a higher proportion of water vapor can be condensed by lowering the pressures on the condensation side, and thereby the heat of condensation may be widely utilized. The heat of condensation is used by operating a multistage evaporation system wherein the evaporation stages are operated at such different pressures that the particular waste vapor of one stage can be condensed in the evaporator of the next stage. Processes for the direct evaporation of waste water are known, which use the vapor as heating steam. These processes suffer from the drawback that the steam is contaminated and that corrosion may take place at the condensing heating surfaces of the equipment. Thus, the condensate that is obtained, in turn, is contaminated. When the heat of condensation is used to generate heating steam, our process therefore is based on condensing the waste vapor on a heating surface and to use conventionally prepared boiler water for the generation of heating steam. The pressures used on the waste-vapor condensation side permit the generation of heating steam for low-pressure steam networks, where this heating steam may be used arbitrarily as any other clean, conventional steam of this kind.

Because complete condensation at the condensation surfaces is not possible due to the presence of the inertly behaving combustion gases in the waste vapors, the uncondensing gases together with the water vapor portion determined by the partial pressure ratio are removed from the condensing chamber and used in the stripping column to expel the components with low-boiling points. Complete heat utilization of the entire vapor flow is achieved thereby.

If the direct blowing in of vapor or gas (stripping process) fails to expel these lower boiling-point components, use may also be made of a rectification column to better separate said components.

Figure 2:
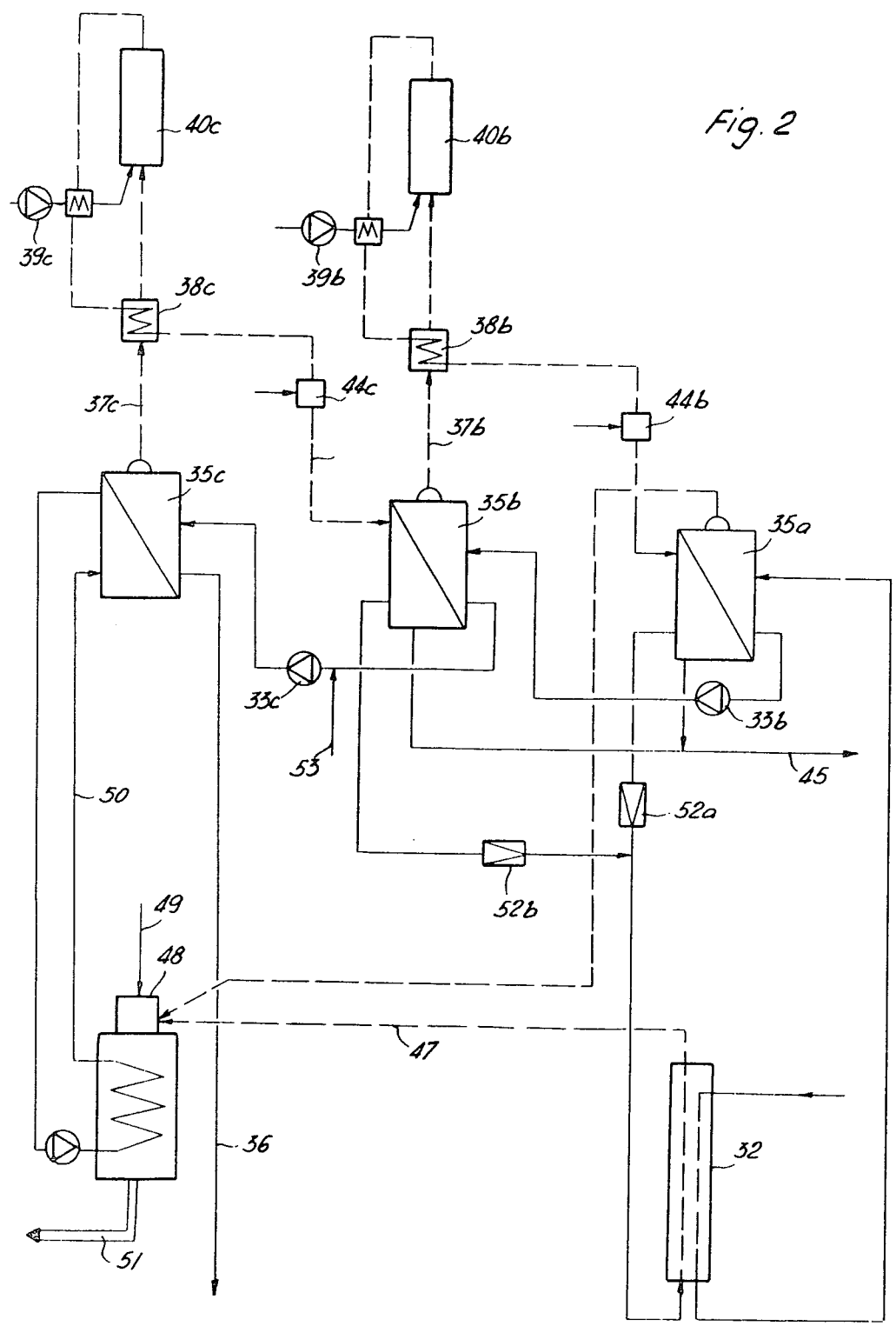
FIG. 2 shows a diagram of the second, preferred embodiment of a waste-water purification apparatus.

The evaporation system shown in FIG. 2 comprises three stages. The individual units corresponding to those in FIG. 1 are provided herewith the corresponding reference numerals. This particularly economical facility with triple-stage evaporation and an autonomous heat economy operates as follows:

The lower boiling-point components in the vapor are enriched by the water-vapor distillation of the waste water in stripping column 32. The waste vapors, together with uncondensable gases obtained from the condensation described below, leave the stripping column while the waste water so prepurified is fed to the first evaporation stage 35a. The waste vapors evaporated at atmospheric pressure in the first evaporation stage are fed to the combustion chamber 48. Auxiliary fuel, for example fuel oil, natural gas or for instance waste solvents, is simultaneously fed through line 49 to the combustion chamber where combustion takes place at 900° to 1200° C., whereby complete oxidation of all organic impurities is achieved. After a dwell time of at least 0.3 second, substantially clean fumes are removed through fumes line 51, frequently without the need for any further cleansing of the fumes. The waste water concentrated in evaporation stage 35a is supplied by means of a pressure pump 33b to evaporator stage 35b. The waste water is further concentrated in pressured evaporator stage 35b and is introduced by means of pump 33c into evaporator stage 35c, which operates under the highest pressure. Finally, the waste water is concentrated so much that it leaves evaporator stage 35c as a concentrate with the high-boiling point impurities through line 36, still in the fluid condition. This residue may be either dried and stored away, or it may be further combusted.

The waste vapors evaporated from the waste water in evaporator stages 35b and 35c are supplied through lines 37b and 37c, respectively, to waste-vapor superheaters 38b and 38c, respectively, wherein the waste-vapor flow is heated to about 600° C. by making use of the heat from the purified hot waste vapors. Simultaneously pressurized oxidation air raised to the corresponding temperature is fed to the waste vapors through compressors 39b and 39c, respectively. The waste vapor and air flows enter the bottom of the waste-vapor oxidation equipment 40b and 40c, respectively, where temperatures of about 800° C. are obtained by means of spontaneous combustion and where complete combustion of the organic, low-boiling point impurities carried along in the waste vapors is achieved. Following the waste-vapor oxidation, the heated waste vapors are used to raise the temperature of the combustion air and waste vapors from the evaporation stage. Thereafter, they are cooled by means of injection cooling systems 44b and 44c, respectively, to saturation temperature. The waste vapors from evaporation stage 35c are used to heat evaporation stage 35b, where they condense at the evaporation surfaces. The uncondensable gases and the component waste vapor leave the evaporation stage 35b in the same manner as the uncondensable gases and their component waste vapor leave evaporation stage 35a, both flows of waste vapors being allowed to expand to atmospheric pressure in expansion stages 52b and 52a, respectively, prior to being combined. The decompressed waste vapors thereupon arrive at stripping column 32 for the steam distillation of the incoming flow of waste water, as initially described. The waste water purified and condensed in evaporation stages 35a and 35b is removed from the facility through line 45.

Evaporation stage 35c is heated from the heat of combustion of the waste-vapor flows of stripping column 32 and also from evaporation stage 35a jointly with auxiliary fuel by means of a heat transfer circuit 50. The auxiliary fuel is so metered that the thermal energy obtained in the low-boiling point, organic vapor flows is precisely supplemented to that amount required by evaporation stage 35b for its (own) heating.

In this manner a purification system is obtained which in regard to thermal economy operates autonomously up to the auxiliary fuel supply and therefore requires no heating steam for heating the evaporation stages.

The oxidation of the waste vapors takes place in the absence of heat supply and only by the caloric value of the proportion of organic impurities in the vapor phase. If this proportion is insufficient, the required superheating temperature may be regulated by supplying fuel.

A practical design example of the oxidation systems 9 and 40b and 49c, respectively, of the previously illustrated systems is shown in FIG. 3. A cylindrical vessel is provided with a pressure-resistant steel jacket 60 which is appropriately lined inside with several insulating layers 61. This keeps the outer wall temperature low when the system is operating. Therefore, the steel jacket may consist of conventional design steel. A short waste-vapor exhaust connector 63 extends into the upper part 62 of the vessel, said part acting as a deflecting chamber. Two short intake connectors 65, 66 provided for the introduction of crude waste vapors and oxidizing air, respectively, extend tangentially but offset by 180 degrees with respect to one another into the vessel's lower chamber 64, which acts as a mixing chamber. The chamber 67 located between said two walls 61 and bounded by a perforated plate 68 disposed above mixing chamber 64, holds packing material 69 for the purpose of increasing the surface area. This equipment may also be designed in other ways, for example, with the waste-vapor inlets and mixing chamber at the top and waste-vapor outlet at the bottom.

The previously heated waste vapors and the oxidizing air are combined in the mixing chamber 64 where they are thoroughly mixed. Thereupon oxidation of the waste-water impurities begins. Packing column 69 acts as a post-reaction or dwell chamber. The oxidation and hence the rise in temperature mostly take place in mixing chamber 64, because that is where most of the impurities are burned. The residual impurities burn in packed column 69, with only a small amount of heat being additionally released in this latter step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. An apparatus for purifying waste water contaminated with high- and low-boiling point organic impurities which comprises a stripping system for separating said waste water into waste vapor and waste water such that the waste water contains about 2 percent of low-boiling point impurities in the form of combustible hydrocarbons and high-boiling point impurities, a combustion chamber into which said waste vapor is introduced and combusted into clean fumes, a forced-circulation evaporation system comprising first, second and third stages for further concentrating said waste water into a fluid concentrate of high boiling point impurities and a waste vapor containing low boiling point impurities in gaseous form together with steam, a waste-vapor outlet from the first stage being connected with said combustion chamber, first and second oxidation chambers into which waste vapors from said second and third stages are introduced and oxidized into purified waste vapor respectively, means for introducing pressurized air into the oxidation chambers, means for introducing waste vapor from said second and third stages into first and second heat exchangers respectively, means for introducing the purified waste said first and second oxidation chambers into said first and second heat exchangers respectively, to raise the temperature of the waste vapor to the starting oxidation temperature in the respective oxidation chambers, means for introducing the waste water to be purified into the stripping system, means for conveying the waste-water impurities from the stripping system to the three-stage evaporation system, and means means for introducing said purified waste vapor from said first and second heat exchangers into said first and second stages respectively, to condense said purified waste vapors into purified waste water, and means for removing said purified waste water from said first and second stages.

2. The apparatus of claim 1, wherein each oxidation chamber is provided with a cylindrical vessel comprising a pressure-resistant outer jacket and an inside insulation, said vessel comprising at one end a mixing chamber equipped with inlets for oxidizing air and crude waste vapors, a reaction chamber containing packing and separated from the mixing chamber by a perforated plate being located above said mixing chamber, said reaction chamber, in turn, being connected through a deflecting chamber with an outlet for clean waste vapors.

3. A process for heat purifying waste water contaminated with high- and low-boiling point organic impurities which comprises introducing said waste water into a stripping column so as to separate said waste water into waste vapor containing low-boiling point impurities and waste water containing about 2 percent of low-boiling point impurities in the form of combustible hydrocarbons and high-boiling point impurities, said waste vapor containing said low-boiling point impurities being supplied to a combustion chamber operating at a temperature in the range of from 900° to 1200° C. producing substantially clean combustion gases, said waste water being introduced into a forced-circulation evaporation system comprising first, second and third evaporation stages so as to further concentrate said waste water such that it leaves said evaporation stages as a concentrate of high-boiling point impurities in a fluid condition and waste vapors containing said low boiling point impurities in gaseous form together with steam, wherein the waste vapors from the first stage are fed directly to a combustion chamber where combustion takes place at 900° to 1200° C., thereby completely oxidizing all of the organic impurities therein, the waste vapors from the second and third stages being heated to about 600° C. while simultaneously introducing pressurized air at 600° C. and the waste vapor from said second and third stages into first and second oxidation chambers, respectively, where temperatures of about 800° C. are obtained by means of spontaneous combustion to thereby bring about complete combustion or oxidation of the organic, low-boiling point impurities present, said heat for heating the waste vapors from the second and third stages being derived from heat exchange with the purified hot waste vapors of the respective oxidation chambers, introducing the resulting steam-gas flow free of organic materials comprising purified waste vapors together with resulting combustion gases from said first and second oxidation chambers into said first and second stages respectively, to produce a condensate of pure water while a portion of the steam remains uncondensed, the overall process being such that the concentrate leaving the third evaporation stage contains concentrated high-boiling point impurities, the entire evaporation and oxidation process taking place under pressure of about 3–20 atmospheres, gauge, said stripping column being operated with the uncondensed remainder of the steam and the oxidizing gas from the evaporation system.

4. The apparatus of claim 1, wherein the stripping system is a stripping column and means are provided for conveying waste vapor from the stripping column to a combustion system which is supplied with an auxiliary fuel system.

* * * * *